(12) United States Patent
Sonera et al.

(10) Patent No.: US 9,594,162 B1
(45) Date of Patent: Mar. 14, 2017

(54) AVIAN HAZARD DETECTION AND CLASSIFICATION USING AIRBORNE WEATHER RADAR SYSTEM

(71) Applicants: Yoel Sonera, Palm Bay, FL (US); Alexander C. Brokman, Melbourne, FL (US); Jeffrey J. Cyr, Melbourne, FL (US); Lisa A. Cole, Palm Bay, FL (US); Don H. Eldredge, Jr., Melbourne, FL (US)

(72) Inventors: Yoel Sonera, Palm Bay, FL (US); Alexander C. Brokman, Melbourne, FL (US); Jeffrey J. Cyr, Melbourne, FL (US); Lisa A. Cole, Palm Bay, FL (US); Don H. Eldredge, Jr., Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 316 days.

(21) Appl. No.: 14/322,669

(22) Filed: Jul. 2, 2014

(51) Int. Cl.
*G01S 13/00* (2006.01)
*G01S 13/95* (2006.01)
*G01S 13/72* (2006.01)
*G01S 7/16* (2006.01)

(52) U.S. Cl.
CPC .............. *G01S 13/953* (2013.01); *G01S 7/16* (2013.01); *G01S 13/726* (2013.01)

(58) Field of Classification Search
CPC ......... G01S 13/953; G01S 13/726; G01S 7/16
USPC ................. 342/26 B, 195, 159, 89, 118, 147
See application file for complete search history.

(56) References Cited

U.S. PATENT DOCUMENTS

| | | | |
|---|---|---|---|
| 3,781,878 A | 12/1973 | Kirkpatrick | |
| 4,043,194 A | 8/1977 | Tanner | |
| 4,940,987 A | 7/1990 | Frederick | |
| 5,049,886 A | 9/1991 | Seitz et al. | |
| 5,198,819 A | 3/1993 | Susnjara | |
| 6,853,328 B1* | 2/2005 | Guice | A01M 1/026 342/22 |
| 7,557,735 B1 | 7/2009 | Woodell et al. | |
| 7,696,921 B1 | 4/2010 | Finley et al. | |
| 7,783,427 B1 | 8/2010 | Woodell et al. | |
| 7,808,422 B1 | 10/2010 | Woodell et al. | |
| 7,864,103 B2 | 1/2011 | Weber et al. | |

(Continued)

OTHER PUBLICATIONS

Adriaan M. Dokter et al., Bird detection by operational weather radar, ERAD 2010—The Sixth European Conference on Radar in Meteorology and Hydrology, Printed online at: http://www.erad2010.org/pdf/oral/tuesday/interstud/05_ERAD2010_0064.pdf, Print date Jul. 2, 2014, 6 pages.

(Continued)

*Primary Examiner* — Timothy A Brainard
(74) *Attorney, Agent, or Firm* — Angel N. Gerdzhikov; Donna P. Suchy; Daniel M. Barbieri

(57) ABSTRACT

A method and system. The method includes receiving weather radar data. The method further includes filtering out weather from the weather radar data to provide filtered radar data. Additionally, the method includes determining whether the filtered radar data includes any non-weather targets. If any of the non-weather targets is a hazard target, the method includes storing data associated with the hazard target in a hazard data structure.

11 Claims, 9 Drawing Sheets

(56) References Cited

U.S. PATENT DOCUMENTS

| | | | |
|---|---|---|---|
| 8,072,368 B1 * | 12/2011 | Woodell | G01S 13/87 342/158 |
| 8,279,109 B1 | 10/2012 | Piesinger | |
| 8,604,963 B1 | 12/2013 | Kronfeld et al. | |
| 2003/0016156 A1 | 1/2003 | Szeto et al. | |
| 2014/0266856 A1 * | 9/2014 | LaPoint | G01S 13/02 342/59 |

OTHER PUBLICATIONS

Roberto Nebuloni et al., Doppler Radar Signatures of Migrating Birds, Printed online at: https://ams.confex.com/ams/pdfpapers/21432.pdf, Print date Jul. 2, 2014, 3 pages.

C.J. Pennycuick, Predicting Wingbeat Frequency and Wavelength of Birds, J. exp. Biol. 150, pp. 171-185 (1990), Printed in Great Britain © The Company of Biologists Limited 1990.

Wildlife Strikes to Civil Aircraft in the United States 1990-2012, Federal Aviation Administration, National Wildlife Strike Database, Serial Report No. 19, Report of the Associate Administrator of Airports, Office of the Airport Safety and Standards, Airport Safety & Certification, Washington, DC, Sep. 2013, 114 Pages.

* cited by examiner

BIRDS (Z)

BIRDS ($V_r$)

RAIN (Z)

RAIN ($V_r$)

NON BIRDS (Z)

NON BIRDS ($V_r$)

AVIAN HAZARD DETECTION AND CLASSIFICATION USING AIRBORNE WEATHER RADAR SYSTEM

FIELD OF THE INVENTION

Embodiments of the invention are directed generally toward a method, apparatus, and system for detecting and classifying avian hazards, which may be hazardous to aircraft.

BACKGROUND

Wildlife strikes of aircraft have increased 5.8-fold from 1,851 in 1990 to a record 10,726 in 2012 (131,096 strikes for 1990-2012). Bird strikes account for over 95% of the wildlife strikes. Current mitigations of strikes include habitat management, population control, harassment/deterrence, and ground based radar tracking near airports. Existing ground-based weather radar systems have been used as a tool to track birds and other biological targets (insects, bats, etc.); however, such existing ground-based weather radar systems have been ineffective above 500 feet above ground level (AGL) and have limited coverage. Over 70 percent of bird strikes occur at or below 500 feet AGL, though strikes occurring above 500 feet AGL are more likely to cause damage to an aircraft.

Therefore, it would be desirable to provide a method, apparatus, and system which provide solutions to the aforementioned existing problems.

SUMMARY

Accordingly, an embodiment includes a method. The method includes receiving weather radar data. The method further includes filtering out weather from the weather radar data to provide filtered radar data. Additionally, the method includes determining whether the filtered radar data includes any non-weather targets. Detected non-weather targets are classified as avian hazards and tracked, then sent to the display or other systems as avian hazard alerts.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Figure 1:
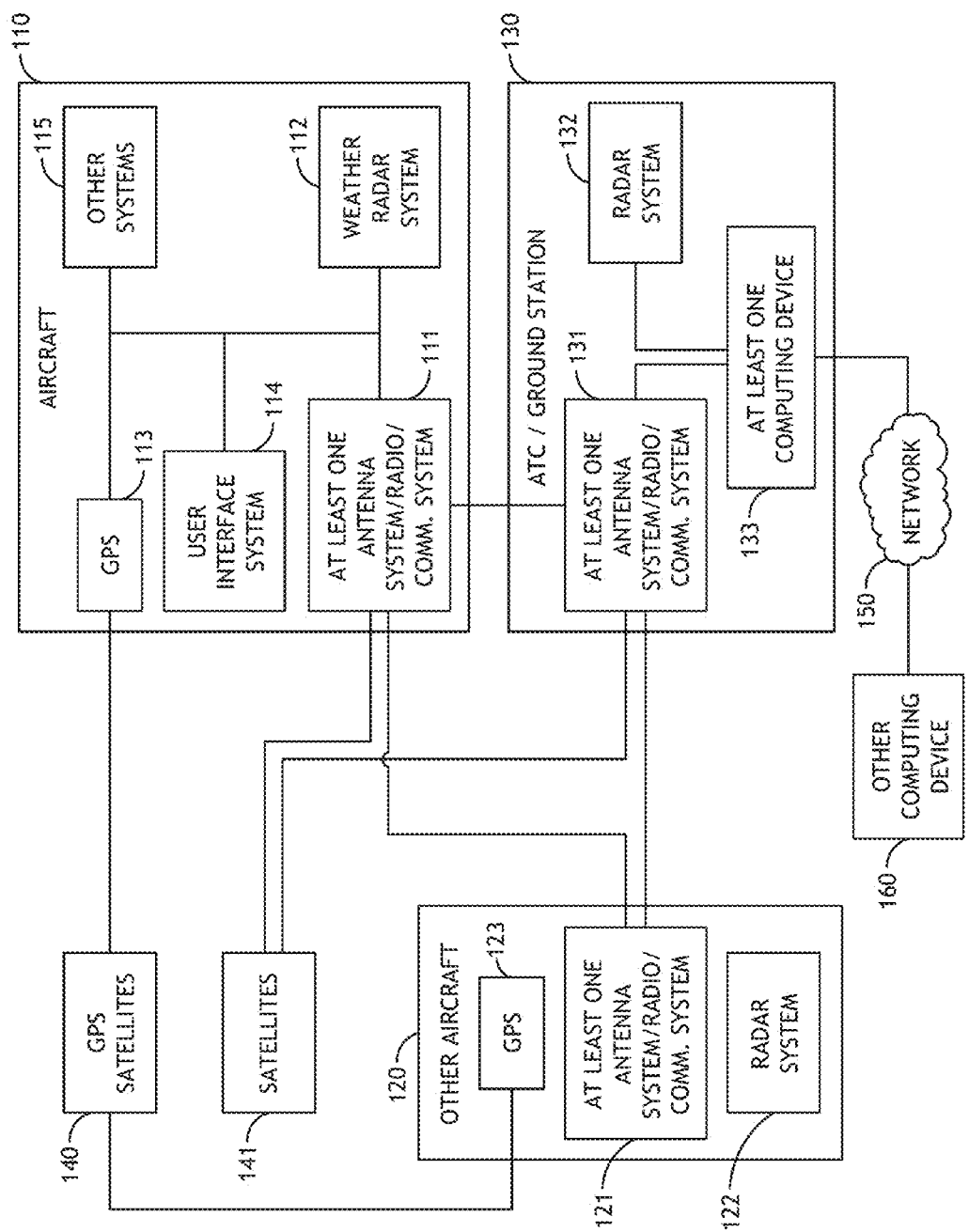
FIG. 1 shows a system topology of embodiments of the invention.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include an airborne weather radar system which may be configured to perform fully automatic detection, assessment, and tracking of bird targets in real time. Such an airborne weather radar system may be configured to perform these processes at higher altitudes and without area limitations as compared with ground-based radar systems. Bird detection processes of some embodiments are configured to run automatically in conjunction with the weather detection processes without increasing a pilot's workload required to operate an onboard weather radar system.

Some embodiments of the invention include a method, apparatus, software or firmware, service, integrated circuit, and/or system configured to actively detect and track birds at or below a threshold altitude (such as 8000 feet AGL). Additionally, in some embodiments, the method, apparatus, software or firmware, service, integrated circuit, and/or system is configured to detect birds within a predetermined radius (e.g., a radius of up to 2 nautical miles, 5 nautical miles, 10 nautical miles, 30 nautical miles, or more) for long-range resolution. Further, some embodiments include a method, apparatus, software or firmware, service, integrated circuit, and/or system configured to track bird hazards relative to winds aloft and flight path. In some embodiments, the method, apparatus, software or firmware, service, integrated circuit, and/or system may be configured to assess biological hazards based on at least one of bird size, group size, group density, aircraft size, aircraft weight, aircraft engine type (e.g., jet engine or propeller), aircraft engine specifications, or the like. In some embodiments, the method, apparatus, software or firmware, service, integrated circuit, and/or system may be configured to generate, output, and present hazard data to the pilot via an output device (e.g., a display device such as a touchscreen display, a weather display overlay, a head-up display (HUD), a head-down display, a head-mounted display (HMD), or the like, a speaker, an earphone, an indicator, a light, an light emitting diode (LED), or the like). Additionally, in some embodiments, the method, apparatus, software or firmware, service, integrated circuit, and/or system may be configured to send hazard data with additional threat information to other systems (other systems onboard the aircraft, systems of other aircraft, satellite systems, air traffic control systems, systems of a ground station, network connected systems, or the like). Similarly, in some embodiments, the method, apparatus, software or firmware, service, integrated circuit, and/or system may be configured to receive other hazard data with additional threat information from other systems and integrate the received other hazard data with the hazard data.

Referring now to FIG. 1, a system 100 of exemplary embodiments is depicted. The exemplary system includes an aircraft 110, an air traffic control station or ground station 130, and global positioning system (GPS) satellites 140. Some embodiments further include at least one other aircraft 120, satellites 141, at least one network 150, and at least one other computing device 160.

In some embodiments, the aircraft 110 includes at least one antenna system, radio, and/or communication system 111, a weather radar system 112, a global positioning system (GPS) device 113, a user interface system 114, as well as other systems 115, equipment, and devices commonly included in aircraft. In some embodiments, some or all of the at least one antenna system, radio, and/or communication system 111, the weather radar system 112, the GPS device 113, the user interface system 114, and/or the other systems 115 are communicatively coupled.

In exemplary embodiments, the at least one antenna system, radio, and/or communication system 111 may be configured to send and/or receive signal, data, and/or voice transmissions to and/or from other aircraft 120, an air traffic control station or ground station 130, satellites 141, or the like. For example, the at least one antenna system, radio, and/or communication system 111 may comprise a transceiver. An exemplary suitable transceiver may include a radiofrequency signal emitter and receiver; such exemplary transceiver may be configured to transmit or broadcast signals to other aircraft (e.g., 120), air traffic control/ground stations 130, or the like. In exemplary embodiment, the transceiver may be implemented as a universal access transceiver (UAT) configured to send and receive automatic dependent surveillance-broadcast (ADS-B) signals. Additionally, in some embodiments, the at least one antenna system, radio, and/or communication system 111 includes a communication radio configured to send and receive voice communications to/from other aircraft 120, air traffic control/ground stations 130, or the like.

In some embodiments, the GPS device 113 receives location data from the GPS satellites 40 and may provide the location data to any of various equipment/systems of the aircraft 110 (e.g. at least one antenna system, radio, and/or communication system 111, a weather radar system 112, a user interface system 114, and/or any of the other systems 115 of the aircraft 110). For example, the GPS device 113 may receive or calculate location data from a sufficient number (e.g., at least four) of GPS satellites 140 in view of the aircraft 110 such that a GPS solution may be calculated.

In some embodiments, the user interface system 114 includes and/or is coupled to at least one input device, at least one output device, and/or at least one input/output device. In some embodiments, the at least one user input device may include a sensor (such as an optical sensor, a camera, a motion tracking sensor, or an eye tracking sensor, an electroencephalograph (EEG) sensor, or the like), a pointer device (such as a mouse, touch pad, trackball, or the like), a microphone, one or more buttons, a keyboard, a gyroscope, a joystick, or the like. In some embodiments, the user output device may include a display, a projector (such as an image projector, a retina projector, or the like), one or more liquid crystal cells, one or more light emitting diodes (LEDs), a speaker, a bell, a gauge, a vibration-producing unit, or the like. Exemplary display devices may also include a weather display overlay, a head-up display (HUD), a head-down display, a head-mounted display (HMD), and/or the like. In some embodiments, the at least one user input/output device includes a touchscreen display. Additionally, in some embodiments, the user interface system may include an eye tracking system and/or a voice recognition system.

In some embodiments, the other systems 115 of the aircraft 110 include a flight management system, an autoflight system, a traffic collision avoidance system (TCAS), an altimeter (e.g., a radio altimeter), and/or the like.

In some embodiments, the other aircraft 120 includes at least one antenna system, radio, and/or communication system 121, a weather radar system 122, a GPS device 123, as well as other systems, equipment, and devices commonly included in aircraft, as similarly described with reference to the aircraft 110, described above.

In some embodiments, the air traffic control or ground station 130 includes at least one antenna system, radio, and/or communication system 131, at least one weather radar system 132, and at least one (e.g., one, two, three, . . . one-hundred, or more) computing device 133. Each of the at least one antenna system, radio, and/or communication system 131 may be configured to receive and/or transmit signals from and/or to aircraft (e.g., aircraft 110, other aircraft 120). Additionally, one or more of the at least one computing device 133 may be communicatively coupled to an input device (e.g., mouse, keyboard, microphone, or the like), an output device (e.g., a display, speaker, or the like), or an input/output device (e.g., a touch-screen display, or the like) configured to interface with a user. For example, a particular computing device may be configured to output data to an output device for presentation to a user, and the particular computing device may be further coupled to an input device configured to receive input data from a user. In some embodiments, some or all of a plurality of computing devices (e.g., 133) are communicatively coupled to each other. In further embodiments, one or more of the at least one computing device 133 is communicatively connected to at least one other computing device 160 via one or more networks 150 (e.g., internet, intranet, or the like). For example, the other computing device 160 may comprise a computing device at a different air traffic control station or a different ground station.

As shown in FIG. 1, at least one processor of the at least one computing device 133 may be configured to run various software applications or computer code stored in a non-transitory computer-readable medium and configured to execute various instructions or operations. Likewise, at least one processor of the other computing device 160 may be configured to run various software applications or computer code stored in a non-transitory computer-readable medium and configured to execute various instructions or operations.

Figure 2:
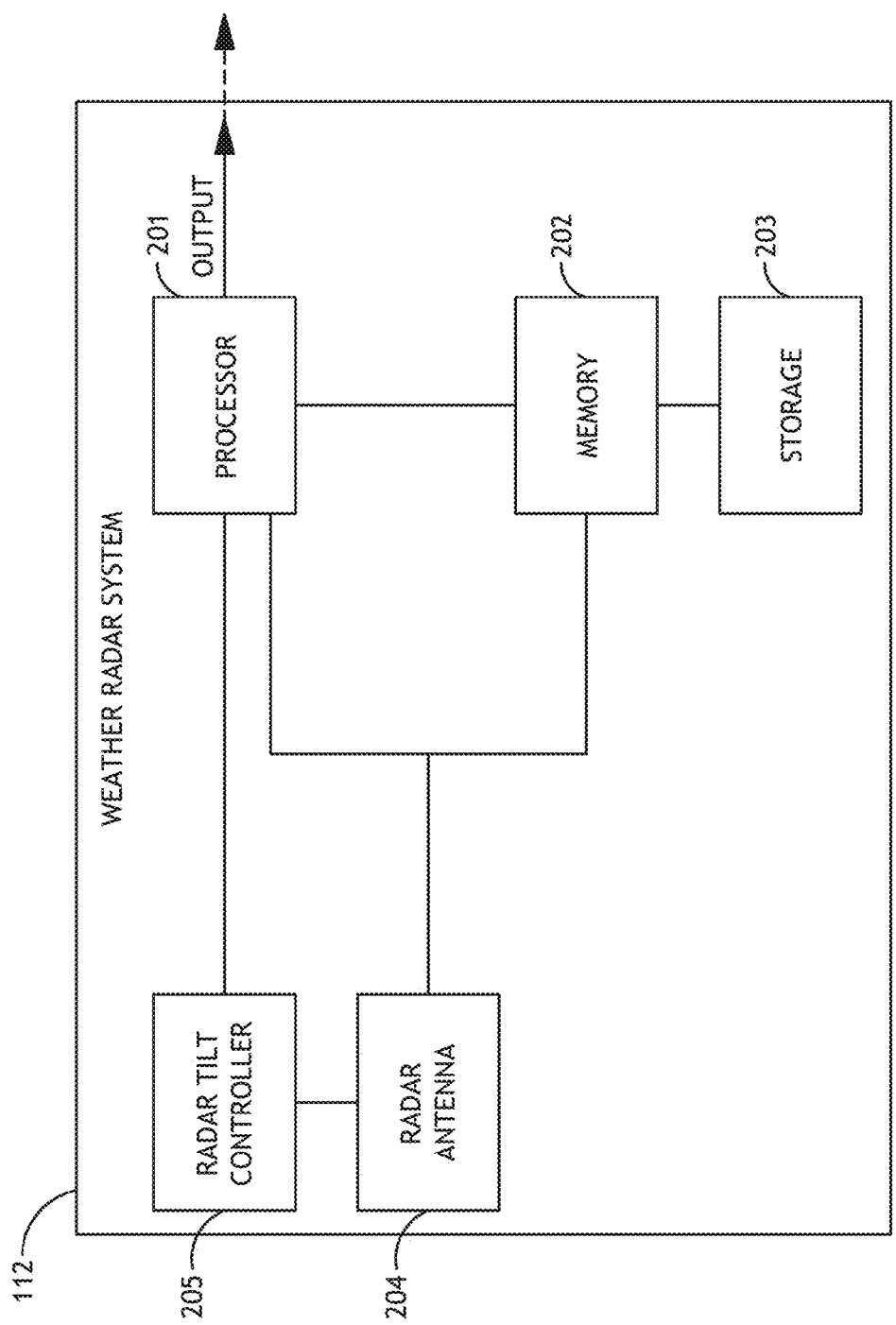
FIG. 2 depicts an exemplary weather radar system of some embodiments.

Referring now to FIG. 2, an exemplary weather radar system 112 of an aircraft is shown. In some embodiments, the weather radar system 112 includes at least one (e.g., one, two, or more) processor 201, memory 202, storage 203, at least one (e.g., one, two, or more) radar antenna 204, a radar tilt controller 205, as well as other components, equipment, and/or devices commonly included in a weather radar system; the at least one processor 201, the memory 202, the storage 203, the at least one (e.g., one, two, or more) radar antenna 204, the radar tilt controller 205, as well as the other components, equipment, and/or devices commonly included in a weather radar system may be communicatively coupled. In some embodiments, the weather radar system 112 is coupled to the user interface system 114 and/or is coupled to or includes a dedicated weather radar display.

Figure 3:
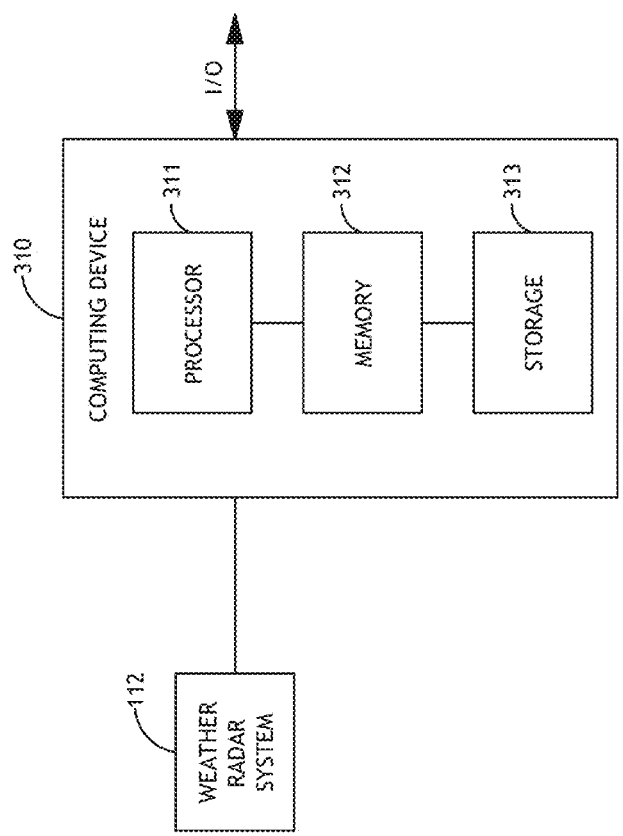
FIG. 3 depicts an exemplary weather radar system coupled to an exemplary computing device of some embodiments.

The processor 201 may be configured to process data received from the radar antenna and output data to one or more output devices (e.g., of the user interface system 114, a weather radar display, or the like) and/or output the processed radar data to another device (e.g., computing device 310) or another system of the aircraft 110. For example, the processor 201 may be configured to output processed radar data to the at least one antenna system, radio, and/or communication system 111 so that the processed radar data may be sent to other aircraft 120, an air traffic control station or ground station 130, satellites 141, or the like. Similarly, the processor 201 of the radar system 112 may be configured to provide radar data to a computing device 310 of the aircraft 110, as shown in FIG. 3. Exemplary embodiments of the invention include the weather radar system 112 being configured for performing fully automatic detection, assessment, and tracking of bird targets in real time. The weather radar system 112 may be configured to perform bird detection, assessment, and tracking processes at higher altitudes (e.g., between 500 feet AGL and 8000 feet AGL) as compared to ground-based radar systems. Bird detection processes of some embodiments are configured to run automatically in conjunction with the weather detection processes without increasing a pilot's workload required to operate an onboard weather radar system 112.

As shown in FIG. 2, the at least one processor 201 of the weather radar device 112 may be configured to run various software applications or computer code stored in a non-transitory computer-readable medium and configured to execute various instructions or operations.

Referring now to FIG. 3, an exemplary computing device 310 communicatively coupled to a weather radar system of an aircraft is shown. In some embodiments, the computing device 310 may be associated with, implemented as, and/or configured to perform processes of one or more of the at least one antenna system, radio, and/or communication system 111, the GPS device 113, the user interface system 114, and/or the other systems 115, equipment, and devices commonly included in aircraft. The exemplary computing device 310 may include at least one (e.g., one, two, or more) processor 311, memory 312, storage 313, as well as other components, equipment, and/or devices commonly included in a computing device of an aircraft.

As shown in FIG. 3, the at least one processor 311 of the computing device 310 may be configured to run various software applications or computer code stored in a non-transitory computer-readable medium and configured to execute various instructions or operations.

Figure 4:
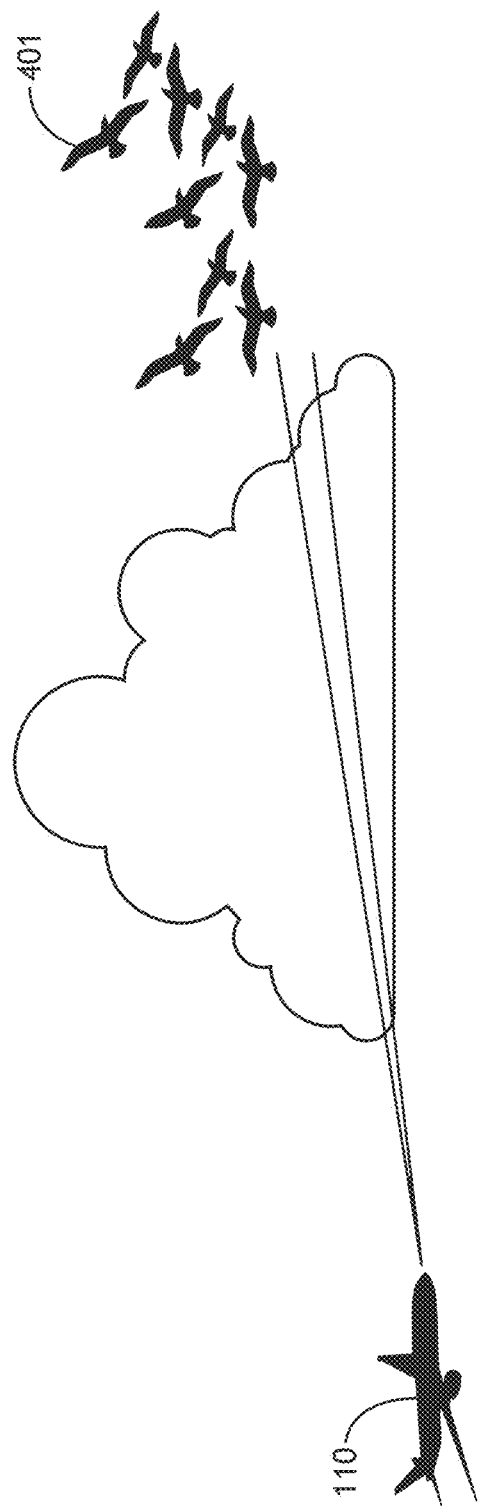
FIG. 4 depicts an exemplary aircraft detection of birds of some embodiments.

Referring now to FIG. 4, an exemplary depiction of an aircraft 110 detecting a group of birds 401 by utilizing a weather radar system is illustrated.

Figure 5:
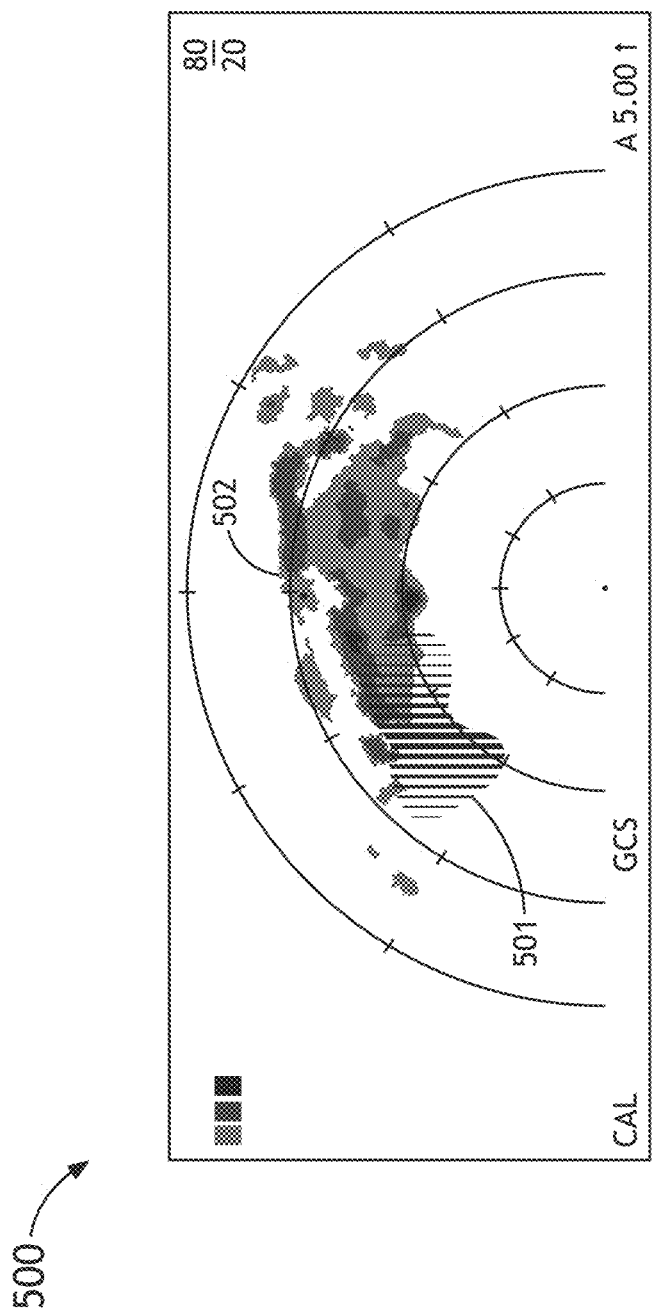
FIG. 5 depicts an exemplary screenshot of a weather radar display showing weather and bird hazard icons of some embodiments.
Figure 6:
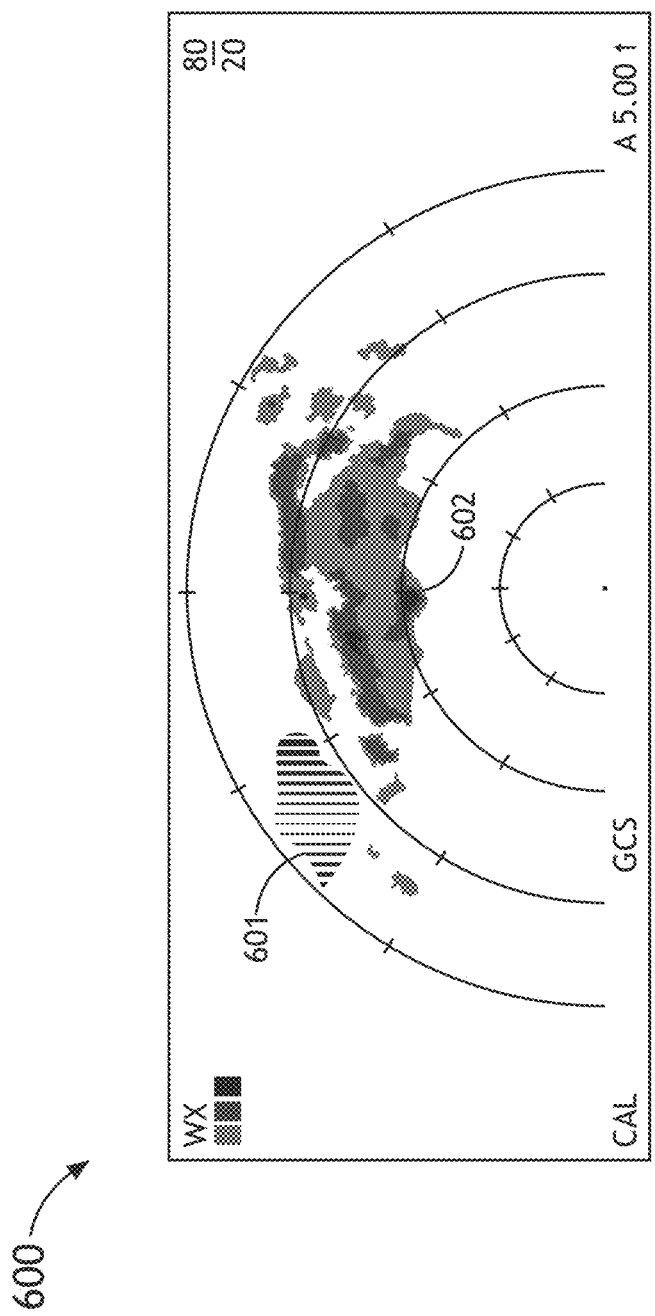
FIG. 6 depicts a further exemplary screenshot of a weather radar display showing weather and bird hazard icons of some embodiments.

Referring now to FIGS. 5-6, exemplary screenshots 500, 600 of a graphical user interface (GUI) of a user interface system 114 and/or a weather radar display of some embodiments are shown. Exemplary screenshot 500 illustrates a bird hazard region 501 and weather graphics 502. Exemplary screenshot 600 illustrates a bird hazard region 601 and weather graphics 602 at a different time than exemplary screenshot 500 and demonstrates the migration of a bird group relative to a weather system. In some embodiments, weather graphics 502, 602 may be displayed as any of various colors (e.g., green, yellow, orange, red, gray, blue, pink, indigo, violet, black, white, and/or the like) and/or shading patterns (e.g., dot patterns, hatching, cross-hatching, lines, or the like) to indicate various attributes of a particular weather system while bird hazard regions 501, 601 may be displayed as different and/or distinguishable color(s) and/or shading pattern(s). In some embodiments, a severity or range of severities of a bird hazard region 501, 601 may be indicated by one or more severity characteristics (e.g., indicated by a particular color(s), a particular shading pattern(s), flashing, aural indication(s) (e.g., beep(s), announcement(s), or the like), or the like).

Figure 7A:
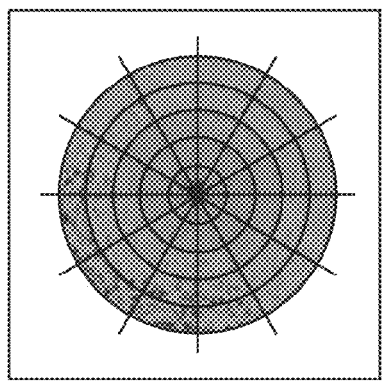
FIGS. 7A-F depict exemplary reflectivity patterns and radial velocity patterns of birds, rain, and non-birds.
Figure 7B:
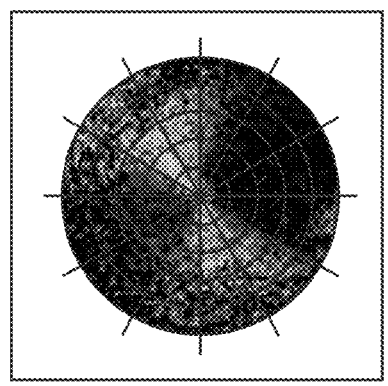
Figure 7C:
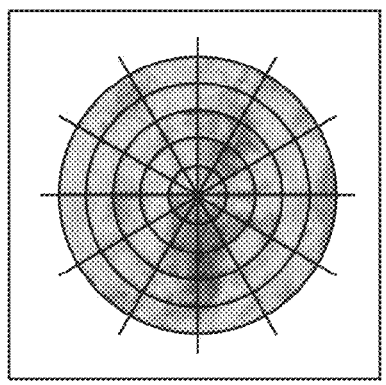
Figure 7D:
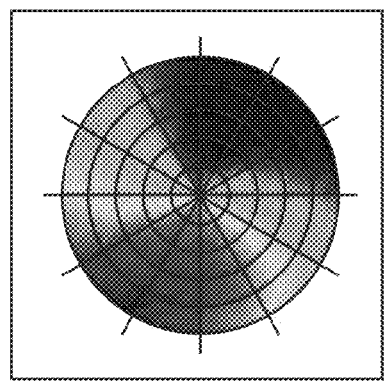
Figure 7E:
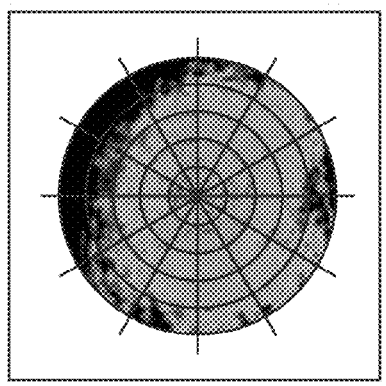
Figure 7F:
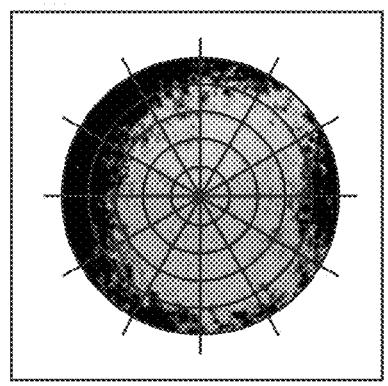

Referring now to FIGS. 7A-F, exemplary reflectivity patterns and radial velocity patterns of birds, rain, and non-birds are shown; a comparison of the reflectivity patterns and radial velocity patterns of birds, rain, and non-birds demonstrates that birds, rain, and non-birds produce identifiable and quantitatively measurable variations in reflectivity patterns and radial velocity patterns. FIGS. 7A-F demonstrate that bird migration shows a higher variability in Doppler velocity than precipitation; by contrast, precipitation shows a radial velocity field that is spatially smooth. FIG. 7A shows an exemplary reflectivity pattern of birds. FIG. 7C shows an exemplary reflectivity pattern of rain. FIG. 7E shows an exemplary reflectivity pattern of non-birds (e.g. insects, etc.). FIG. 7B shows an exemplary radial velocity pattern of birds. FIG. 7D shows an exemplary radial velocity pattern of rain. FIG. 7F shows an exemplary radial velocity pattern of non-birds. As is demonstrated by FIGS. 7A-7F, bird echoes and other clear-air signals tend to be considerably weaker than precipitation (e.g., rain, snow, etc.) signals; radial velocity of scatterers may be used to distinguish between birds, insects and precipitation. The amplitude of the echo intensity of a biological target also shows rhythmic fluctuations that are, in case of birds, correlated with the wing beats. Reflectivity and radial velocity may be used to classify a target as a bird. Birds typically fly within a range of airspeeds between 7 to 20 meters per second (m/s), which is highly influenced by wind. In some embodiments, by utilizing the velocity image, speeds of targets are compared to speeds of the prevailing winds. As such, in some embodiments, upon determining that target relative wind speed meets the avian target wind speed relative velocity threshold (e.g., 5 knots, 15 knots, or more relative to wind speed vector), a processor (e.g., 201 or 311) or a computing device (e.g., 310, 133, or 160) may determine that such targets are birds. Additionally, some embodiments include detecting other biological targets, such as insects, by detecting based on insects' wind speed relative velocity being less (e.g., much less) than the avian threshold velocity; in some embodiments, detected insects are excluded and/or distinguished from potential bird hazard data.

Some embodiments of the invention include the weather radar system 112 measuring reflectivity data and radial velocity data; a processor (e.g., 201 or 311) or a computing device (e.g., 310, 133, or 160) may then determine whether one or more radar targets are birds and determine one or more attributes (e.g., bird size, bird location, group size, group density, group location, and/or the like) of the birds based at least on the measured reflectivity data and/or the radial velocity data.

Figure 8A:
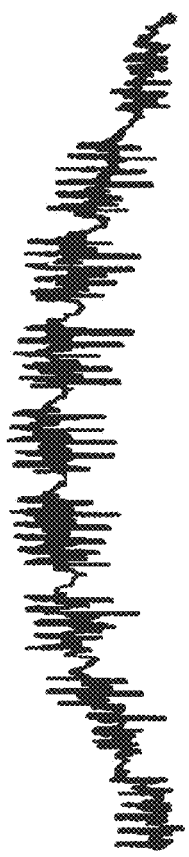
FIG. 8A depicts an exemplary wing beat pattern of a bird.
Figure 8B:
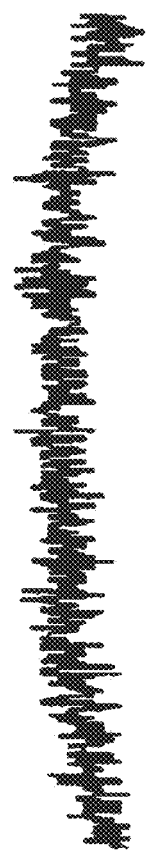
FIG. 8B depicts an exemplary wing beat pattern of an insect.

Referring now to FIGS. 8A and 8B, an exemplary reflectivity data of an avian target showing the wing beat pattern of a bird and an exemplary wing beat pattern of an insect are shown, respectively. Insect targets have fast and random wing beat patterns while birds show up as periodic or regular patterns. Additionally, larger birds tend to have lower wing beat frequencies which could result in greater damage to the aircraft. In some embodiments, measured wing beat data may be used to determine (e.g., identify) whether a biological target is a bird or an insect.

Figure 9:
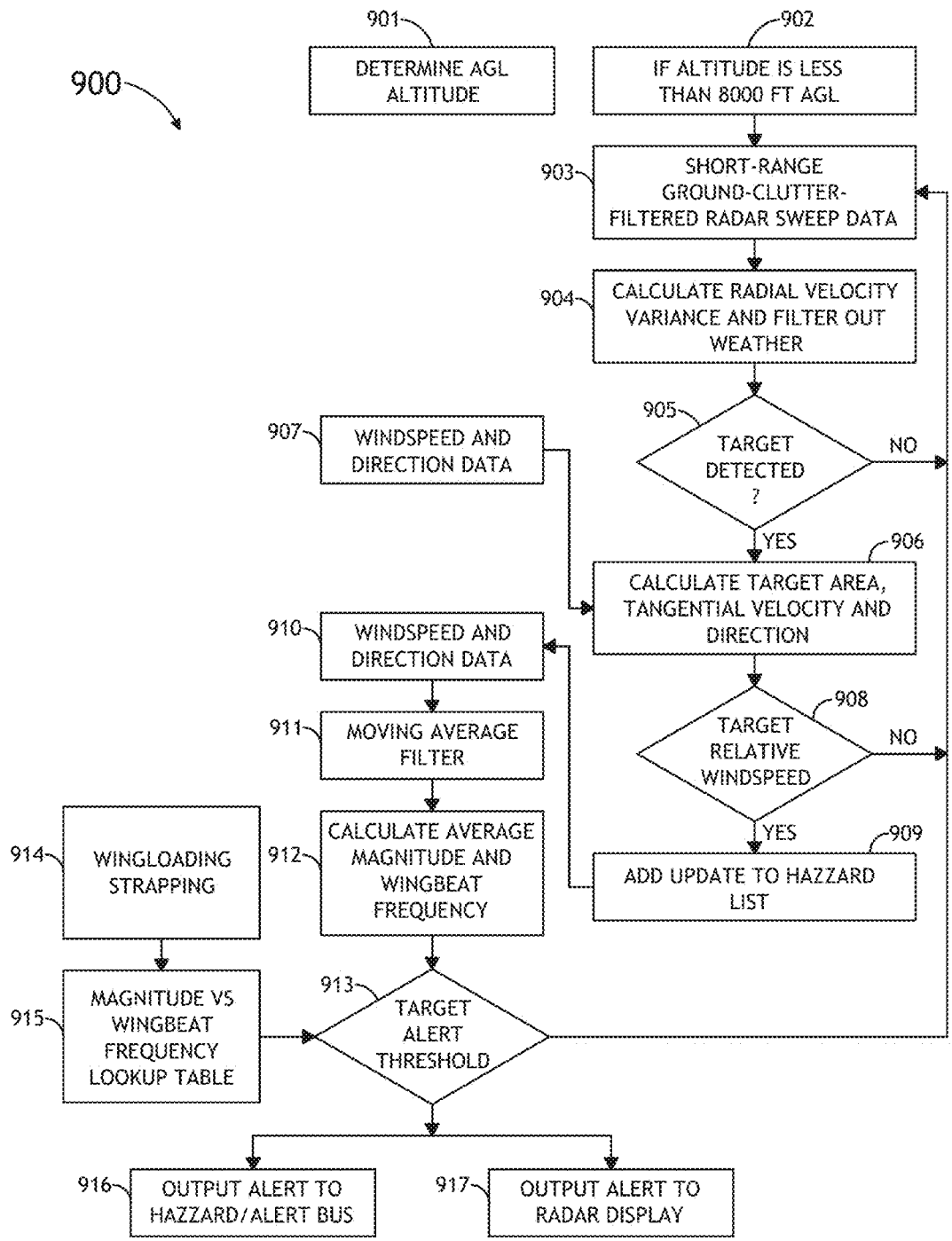
FIG. 9 depicts an exemplary method of some embodiments.

Referring now to FIG. 9, a flow diagram of an exemplary method 900 of some embodiments is shown. Some embodiments of the invention include performance of a method 900. It is contemplated that the steps of embodiments of the method 900 can be performed by one or some combination of: a weather radar system 112, 122, 132; at least one computing device 310, 133, 160; one or more processors of the at least one processor 201 of the weather radar system 112; one or more processors of the at least one processor 311 of the computing device 310; one or more of the at least one processor of the computing device 133, 160; at least one radar antenna 204 of the weather radar system 112, 122, 132; at least one component, circuit, or module of a computing device of the system 100; software or firmware executed on a processor or computing device; other computing devices; other computer components; and/or on other software, firmware, or middleware of the system topology 100. The method 900 can include any or all of steps 901, 902, 903, 904, 905, 906, 907, 908, 909, 910, 911, 912, 913, 914, 915, 916, and/or 917, and it is contemplated that the method 900 can include additional steps as disclosed throughout, but not explicitly set forth in this paragraph. Further, it is fully contemplated that the steps of the method 900 can be performed concurrently, non-concurrently, sequentially, or in a non-sequential order. Likewise, it is fully contemplated that the method 900 can be performed prior to, concurrently, subsequent to, or in combination with the performance of one or more steps of one or more other embodied methods disclosed throughout. Further it is fully contemplated that the method 900 or at least some of the steps of the method 900 may be repeated or cycled.

Step 901 may comprise measuring an AGL altitude. Step 902 may comprise determining whether the AGL altitude is below a predetermined threshold altitude. For example, the threshold altitude may be 8,000 feet AGL; while a predetermined threshold altitude may be 8,000 feet AGL, it is fully contemplated that the predetermined threshold altitude may be set to any desired altitude. Upon a determination that AGL altitude is below a predetermined threshold altitude, the step 903 may comprise performing a weather radar sweep and receiving radar sweep data. In some implementations, the step 903 also includes modifying a tilt of the radar antenna based on at least one of an altitude, a waypoint, and/or flight phase information so that radar sweep covers a current flight path. The step 903 may also comprise performing a ground clutter suppression operation; for example, the ground clutter suppression operation may include filtering out short range, ground clutter from the radar sweep data. Step 904 may comprise calculating a radial velocity variance on the radar sweep data by utilizing Doppler data to obtain filtered radar sweep data without any weather. The step 905 may comprise determining whether at least one non-weather target is detected. If no non-weather target is detected, the method 900 may include subsequently performing step 903 (and steps subsequent thereto).

If at least one non-weather target is detected, the method 900 may include performance of a step 905. Concurrently or non-concurrently to the performance of step 906, the method 900 may include the performance of a step 907, which includes measuring wind speed and direction to obtain wind speed data and wind direction data. The step 906 may include calculating, for each of the at least one non-weather target, a target area and/or volume, a tangential velocity, and a direction. Upon calculating the area and/or volume, the tangential velocity, and the direction of each of the at least one non-weather target, the method 900 may include the performance of a step 908, which includes comparing, for each of the at least one non-weather target, a target area and/or volume, a tangential velocity, the calculated tangential velocity and calculated direction of the target relative to a wind speed vector; the step 908 may further include determining whether the calculated tangential velocity and/or calculated direction exceed a threshold velocity relative to the wind speed vector and/or a threshold direction relative to the wind speed vector. Likewise, determining whether the calculated tangential velocity and/or calculated direction exceed a threshold velocity relative to the wind speed vector and/or a threshold direction relative to the wind speed vector may comprise determining whether the calculated tangential velocity and/or calculated direction are outside of a threshold velocity range relative to the wind speed vector and/or a threshold direction range relative to the wind speed vector. Exemplarily, the threshold velocity and the threshold direction may be based upon the wind speed vector. The step 908 may also include determining whether a particular non-weather target is a hazard based on: the calculated tangential velocity of the particular non-weather target; the calculated direction of the particular non-weather target; and/or one or more of a threshold velocity, a threshold velocity range, a threshold direction, a threshold direction range, a threshold area, and/or a threshold area range. Upon a determination that no hazard exists, the method 900 may include subsequently performing step 903 (and steps subsequent thereto).

Upon a determination that one or more non-weather targets are hazards, the method 900 may include performance of a step 909. The step 909 may include updating a hazard data structure to include updated hazard data (e.g., unique hazard identification, size, location, speed, direction, time of measurement, radar sweep sequence number, and/or the like) of previously detected hazard targets and/or adding newly detected hazard targets and associated hazard data (e.g., unique hazard identification, size, location, speed, direction, time of measurement, radar sweep sequence number, and/or the like) to the hazard data structure. The hazard data structure may exemplarily comprise a database, a list, a table, or the like stored in a computer readable medium (e.g., memory, storage, or the like).

Upon updating the hazard data structure to include updated hazard data of previously detected hazard targets and/or adding newly detected hazard targets and associated hazard data to the hazard data structure, the method 900 may include a step 910, which includes performing a one or more operations (e.g., step 911, step 912, and/or the like) on the hazard data structure. In some implementations, the method 900 may include a step 911, which includes filtering the hazard targets of the hazard data structure; for example, filtering the hazard targets of the hazard data structure may comprise performing moving computations (e.g., average, minimum, maximum, or the like) over a predetermined trailing time frame (e.g., 5 seconds, 10 seconds, 30 seconds, 60 seconds, or the like), a predetermined trailing number of radar sweeps, or the like on the hazard targets and associated hazard data to determine moving hazard data values (e.g., average size, minimum size, maximum size, periodic size maxima, periodic size minima, time between periodic size maxima and minima, average location, average speed, average direction, or the like) for each hazard target of the hazard data structure. In some implementations, the method 900 may include a step 912, which includes calculating an average reflectivity and an average wing beat frequency for each hazard target of the hazard data structure based on the moving hazard data values. For example, the average reflectivity may be based on an average of a difference between periodic size maxima and periodic size minima; additionally, for example, the average wing beat frequency may be based upon an average amount of time between periodic size maxima and periodic size minima.

In some implementations, the method 900 may include step 914 and/or step 915, which may be performed concurrently or non-concurrently to step 913. The step 914 may include accessing predetermined data of aircraft wing loading settings. The data of the aircraft wing loading settings may be stored within the hazard data structure or may be contained within another data structure (e.g., which may exemplarily comprise a database, a list, a table (e.g., a lookup table), or the like stored in a computer readable medium (e.g., memory, storage, or the like)). The data of the aircraft wing loading settings may comprise information of threshold impact tolerances for a particular aircraft. For example, the aircraft wing loading settings may be specific to a particular aircraft type, size, model, and/or the like.

The step 915 may include, for each hazard target of the hazard data structure, accessing predetermined relationship data of a predetermined relationship between target reflectivity and wing beat frequency. The predetermined relationship data of the predetermined relationship may be stored within the hazard data structure or may be contained within another data structure (e.g., which may exemplarily comprise a database, a list, a table (e.g., a lookup table), or the like stored in a computer readable medium (e.g., memory, storage, or the like)). The data of the predetermined relationship between average reflectivity and wing beat frequency may comprise information of an expected impact value for a particular target (e.g., a bird) based on a particular average reflectivity and particular wing beat frequency; for example, the data of the predetermined relationship may be contained in a lookup table of average reflectivity versus wing beat frequency to provide an impact value.

The step 913 may include determining, for each hazard target of the hazard target data structure, whether a particular hazard target exceeds an alert threshold based on at least one of a threshold impact tolerance for a particular aircraft, an impact value, calculated wing beat frequency, and/or calculated average reflectivity. For example, after determining an impact value (based on calculated wing beat frequency and calculated average reflectivity) for a particular hazard target, the step 913 may include determining whether the expected impact value exceeds the threshold impact tolerance for the particular aircraft. If none of the expected impact values of the at least one hazard target exceed the threshold impact tolerance for the particular aircraft, the method 900 may include subsequently performing step 903 (and steps subsequent thereto).

Upon a determination that one or more of the expected impact values of the at least one hazard target exceed the threshold impact tolerance for the particular aircraft, the method 900 may include a step (e.g., step 916, 917, or the like), which includes outputting a hazard alert or data of and/or associated with the hazard data structure to a user interface system 114, a weather radar display, another output device, one or more particular computing devices, one or more particular systems, or the like. For example, the method may include the step 916, which includes outputting a hazard alert to a bus, which may communicatively couple the weather radar system 112 to another onboard system of the aircraft 110. Additionally, for example, the method may include the step 917, which may exemplarily include outputting a hazard alert to a weather radar display configured to graphically present hazard regions 501, 601 (as exemplarily shown in FIGS. 5-6). Additionally, in some implementations, the method 900 includes: for each hazard target of the hazard data structure, determining an expected impact value based on the average reflectivity and the average wing beat frequency for a particular hazard target; determining whether the expected impact value exceeds a threshold impact tolerance for a particular aircraft; and upon a determination that one or more of the expected impact values exceed the threshold impact tolerance for the particular aircraft, outputting a hazard alert or data of or associated with the hazard data structure. In some embodiments, the method 900 may include: outputting data of or associated with the hazard data structure to a communication system; and sending the data of or associated with the hazard data structure to another system (e.g., another onboard system or an off-board system) or a computing device (e.g., an onboard computing device or an off-board computing device).

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
  receiving, by at least one processor of an aircraft, weather radar data from at least one weather radar antenna of the aircraft;
  filtering out, by the at least one processor of the aircraft, weather from the weather radar data to provide filtered radar data;
  determining, by the at least one processor of the aircraft, that the filtered radar data includes at least one non-weather target;
  upon a determination that the filtered radar data includes the at least one non-weather target, calculating, by the at least one processor of the aircraft, a target area, a tangential velocity, and a direction for the at least one non-weather target;
  determining, by the at least one processor of the aircraft, that the at least one non-weather target is at least one hazard target based at least on at least one of: a calculated tangential velocity of a particular non-weather target, a calculated direction of the particular non-weather target, a threshold velocity, or a threshold direction;
  upon a determination that the at least one non-weather target is the at least one hazard target, storing, by the at least one processor of the aircraft, data associated with the at least one hazard target in a hazard data structure;
  determining, by the at least one processor of the aircraft, moving hazard data values of the hazard data structure;

for each hazard target of the hazard data structure, determining, by the at least one processor of the aircraft, an expected impact value;

determining, by the at least one processor of the aircraft, whether the expected impact value exceeds a threshold impact tolerance for the aircraft; and upon a determination that one or more of the expected impact values exceed the threshold impact tolerance for the aircraft, outputting, by the at least one processor of the aircraft, a hazard alert or data of the hazard data structure.

2. The method of claim 1, wherein the weather radar data includes data of one or more weather radar sweeps from the at least one weather radar antenna of the aircraft.

3. The method of claim 1, further comprising:
filtering, by the at least one processor, ground clutter out of the weather radar data.

4. The method of claim 1, further comprising:
calculating, by the at least one processor, a radial velocity variance of the weather radar data,
wherein determining, by the at least one processor, that the filtered radar data includes at least one non-weather target further comprises:
determining, by the at least one processor, that the filtered radar data includes at least one non-weather target based at least on the radial velocity variance.

5. The method of claim 1, wherein storing, by the at least one processor, data associated with the at least one hazard target in a hazard data structure further comprises:
updating, by the at least one processor, the hazard data structure to include updated hazard target data of previously determined hazard targets and adding newly determined hazard target data of newly determined hazard targets to the hazard data structure.

6. A system, comprising:
at least one radar antenna configured to receive weather radar signals, wherein the at least one radar antenna is implemented on an aircraft; and
at least one processor, one or more of the at least one processor being communicatively coupled to the at least one radar antenna, the at least one processor being configured for:
receiving weather radar data from the at least one radar antenna of the aircraft;
filtering out weather from the weather radar data to provide filtered radar data;
determining that the filtered radar data includes at least one non-weather target;
determining that the at least one non-weather target is at least one hazard target;
upon a determination that the at least one non-weather target is the at least one hazard target, storing data associated with the at least one hazard target in a hazard data structure;
determining moving hazard data values of the hazard data structure;
calculating an average reflectivity and an average wing beat frequency for each hazard target of the hazard data structure based on the moving hazard data values;
for each hazard target of the hazard data structure, determining an expected impact value based on the average wing beat magnitude and the average wing beat frequency for a particular hazard target;
determining whether the expected impact value exceeds a threshold impact tolerance for a particular aircraft; and
upon a determination that one or more of the expected impact values exceed the threshold impact tolerance for the particular aircraft, outputting a hazard alert or data of or associated with the hazard data structure.

7. A computer program product comprising a non-transitory computer readable medium having program code embodied therewith, the program code executable by at least one processor to perform a method, the method comprising:
receiving, by at least one processor, weather radar data from at least one weather radar antenna of an aircraft;
filtering out, by the at least one processor, weather from the weather radar data to provide filtered radar data;
determining, by the at least one processor, that the filtered radar data includes at least one non-weather target;
determining, by the at least one processor, that the at least one non-weather target is at least one hazard target;
upon a determination that the at least one non-weather target is the at least one hazard target, storing, by the at least one processor, data associated with the at least one hazard target in a hazard data structure;
determining, by the at least one processor, moving hazard data values of the hazard data structure;
calculating, by the at least one processor, an average reflectivity and an average wing beat frequency for each hazard target of the hazard data structure based on the moving hazard data values;
for each hazard target of the hazard data structure, determining, by the at least one processor, an expected impact value based on the average reflectivity and the average wing beat frequency for a particular hazard target;
determining, by the at least one processor, whether the expected impact value exceeds a threshold impact tolerance for a particular aircraft; and
upon a determination that one or more of the expected impact values exceed the threshold impact tolerance for the particular aircraft, outputting, by the at least one processor, a hazard alert or data of or associated with the hazard data structure.

8. The computer program product of claim 7, wherein upon the determination that the one or more of the expected impact values exceed the threshold impact tolerance for the particular aircraft, outputting, by the at least one processor, the hazard alert or the data of or associated with the hazard data structure further comprises:
upon the determination that the one or more of the expected impact values exceed the threshold impact tolerance for the particular aircraft, outputting, by the at least one processor, the hazard alert to a weather radar display.

9. The computer program product of claim 7, wherein upon the determination that the one or more of the expected impact values exceed the threshold impact tolerance for the particular aircraft, outputting, by the at least one processor, the hazard alert or the data of or associated with the hazard data structure further comprises:
upon the determination that the one or more of the expected impact values exceed the threshold impact tolerance for the particular aircraft, outputting, by the at least one processor, the data of or associated with the hazard data structure to a communication system; and
sending the data of or associated with the hazard data structure to another system or a computing device.

10. The computer program product of claim 7, wherein the method further comprises:

determining, by the at least one processor, whether the expected impact value exceeds a threshold impact tolerance for any aircraft.

11. The computer program product of claim 10, wherein the method further comprises:

upon a determination that one or more of the expected impact values exceed the threshold impact tolerance for any aircraft, outputting, by the at least one processor, a hazard alert or data of or associated with the hazard data structure to a communication system; and sending the hazard alert or the data of or associated with the hazard data structure to an off-board system or an off-board computing device.

\* \* \* \* \*